Dec. 25, 1962    W. ROTH    3,070,790
ACOUSTIC TRANSDUCERS
Filed Dec. 30, 1959

INVENTOR
Wilfred Roth
BY
ATTORNEYS

United States Patent Office 3,070,790
Patented Dec. 25, 1962

3,070,790
ACOUSTIC TRANSDUCERS
Wilfred Roth, 58 Brainard Road, West Hartford, Conn.
Filed Dec. 30, 1959, Ser. No. 863,007
18 Claims. (Cl. 340—384)

This invention relates to acoustic transducers, particularly transducers for use at ultrasonic frequencies.

Ultrasonic transducers are well known at the present time. Commonly they are designed to convert an electric wave (voltage or current, as the case may be) into an ultrasonic wave, and vice versa. When used for transmitting, the transducer is energized with the electric wave and transmits an ultrasonic wave. As a receiver, the ultrasonic wave impinges on the transducer and produces an output electric wave.

The transducers commonly have magnetostrictive elements or piezoelectric crystals to convert from electric to acoustic energy, and vice versa, although other types of actuating elements are sometimes employed. Mechanical resonance is often employed to improve efficiency, and is especially useful for narrow band transducers designed to transmit or receive ultrasonic energy in a narrow frequency range. Such transducers are frequently expensive, and are often limited in stability, temperature range of operation, etc. In addition, problems in mounting are often encountered since in a resonant structure the manner of mounting the transducer may affect the frequency of operation and also the efficiency.

It is a primary object of the present invention to provide an efficient, rugged ultrasonic transducer which is simple and economical to manufacture and in which mounting problems are largely eliminated.

In accordance with the invention, a diaphragm is employed to deliver ultrasonic energy to a medium, or to receive energy therefrom. Suitable means is provided to drive the diaphragm, or respond to motion thereof. A magnetostrictive type of mechanism is preferred, but it is possible to employ other types if desired. The periphery of the diaphragm is attached to or formed as a part of a dynamic clamping or choke member which causes the diaphragm to oscillate substantially as a clamped diaphragm. To this end, the length of the clamping member in terms of wavelength at the operating frequency is selected so that longitudinal ultrasonic waves are produced therein which provide a high impedance to movement of the diaphragm periphery in the direction normal thereto. The diaphragm and associated clamping member may then be supported in a casing, preferably by mounting means near the plane of the diaphragm periphery.

In accordance with a further feature of the invention, the dynamic clamping member is designed so that a ring mode of oscillation is produced therein by the oscillation of the diaphragm. This ring mode of oscillation has been found highly valuable in securing satisfactory operation without requiring excessively close tolerances to be maintained.

Inasmuch as the dynamic clamping member serves to clamp the periphery of the diaphragm, little or no energy is transmitted to the casing, and consequently the transducer operation is practically independent of the manner of holding the casing when the transducer is installed for use. Further, by employing both longitudinal and ring modes of oscillation in the clamping member, critical tolerances in the clamping member and in the diaphragm are avoided, thereby greatly facilitating economical manufacture.

The invention will be more fully understood from the following description of a specific embodiment thereof, taken in conjunction with the drawings in which.

Figure 1:
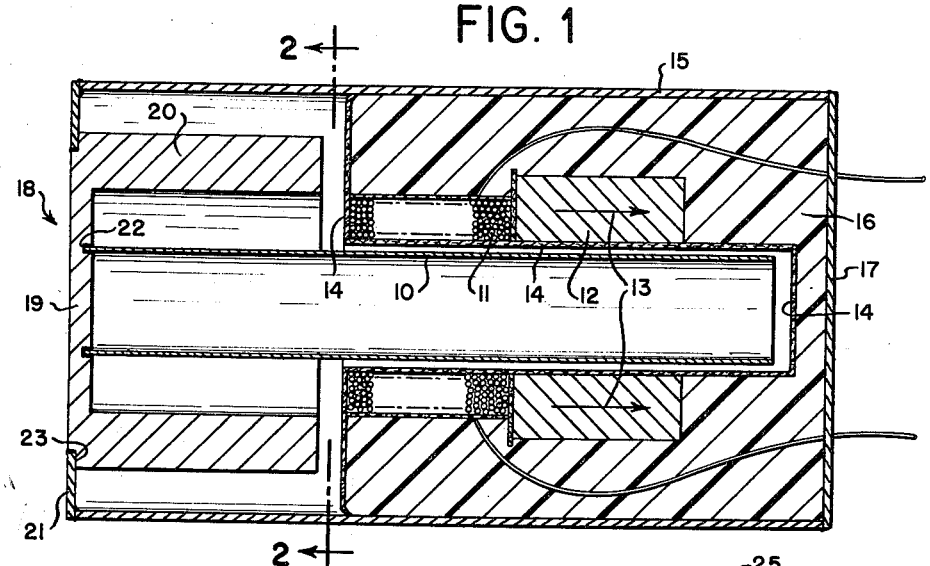
FIG. 1 is a cross-section taken along the axis of the transducer.
Figure 2:
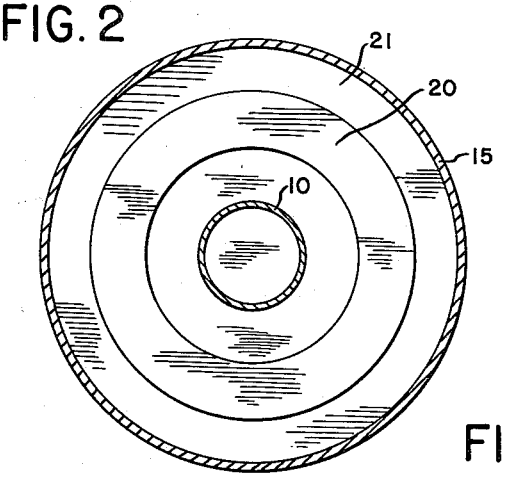
FIG. 2 is a transverse cross-section taken along the line 2—2 of FIG. 1.

Referring to FIG. 1, a magnetostrictive type of actuating mechanism is provided comprising a cylindrical tube 10 of magnetostrictive material such as nickel or nickel alloy, a coil 11 encircling tube 10, and a permanent magnet 12 which provides a D.C. biasing magnetic field. As shown, the magnet 12 is annular and encircles the magnetostrictive tube 10, the magnetomotive force being shown by arrows 13. The configuration and location of the permanent magnet may differ considerably from that shown so long as a proper magnetic field is obtained, as is well known in the art. In some applications it may be necessary to employ a separate magnet.

Coil 11 and magnet 12 are conveniently mounted on a coil form 14 which is inserted in casing 15 and held therein by potting material 16, such as epoxy resin. The rear end of the transducer may then be closed by a plate 17. The coil form may be of paper or other suitable material, and the casing 15 may be of metal, plastic, etc.

The magnetostrictive tube 10 is joined at its front end to member 18. Member 18 has a diaphragm section 19 and a dynamic clamping or choke section 20 formed integrally. If desired, the diaphragm and clamping section could be formed separately and then strongly joined to form a united structure. Member 18 will ordinarily be of metal, for example, steel, brass, etc., and is mounted in casing 15 by a thin annular section 21.

For convenience in manufacture, the rear face of diaphragm 19 may have a circular groove 22 formed therein in which the front end of tube 10 is inserted and joined by soldering, brazing, etc. The periphery of the front face of member 18 may be grooved at 23 so that ring 21 is flush with the front face of diaphragm 19. Ring 21 may be attached to member 18 by soldering, brazing, etc. and may be attached to casing 15 by the same technique if the casing is metal. In many cases, it may be preferred to machine member 18 so as to form annular section 21 as an integral flange.

Diaphragm 19 functions essentially as a clamped circular diaphragm, the periphery being clamped by member 20, as will be described more fully hereinafter. As a transmitting transducer, alternating current supplied to coil 11 causes vibration of the magnetostrictive tube 10 in the axial direction, in the presence of the biasing magnetic field produced by magnet 12. This causes diaphragm 19 to vibrate and deliver ultrasonic energy to the air or other medium with which it is in contact. On the other hand, as a receiving transducer ultrasonic energy impinging on diaphragm 19 causes axial vibration of tube 10, thereby inducing a voltage in coil 11.

The dimensions of the magnetostrictive tube 10, the diaphragm 19 and the clamping member 20 to give the proper natural mechanical resonant frequencies are important in securing optimum operation. These resonant frequencies are functions of the actual physical dimensions and the velocities of propagation of ultrasonic waves in the members. Since the members are physically connected, they are mechanically coupled and the individual natural resonant frequencies interact in producing the overall operating frequency of the transducer. These relationships will now be discussed.

Diaphragm 19 by itself has a certain natural resonant frequency depending on its diameter and thickness, and the material of which it is made. Inasmuch as the diaphragm merges into clamping member 20, the effective diaphragm diameter may be expected to be slightly greater than the inside diameter of member 20.

Magnetostrictive tube 10, by itself, also has a natural resonant frequency. However, with the front end of tube 10 attached to diaphragm 19, the coupling between the two elements gives a resultant resonant frequency which differs from the individual resonant frequencies.

Tube 10, by itself, would have a resonant frequency such that its length would be equal to a half-wavelength (or in general a multiple of half-wavelengths, the term "multiple" being understood to include one). This is the situation when both ends of the tube are free. The mechanical impedance at each end would therefore be small. If the diaphragm 19 were extremely flexible, the impedance at the center thereof would be very low. Hence if tube 10 were attached to the center of such a diaphragm, its length would be substantially a half-wavelength.

However, inasmuch as diaphragm 19 will ordinarily be quite stiff, and the front end of tube 10 is joined thereto somewhere between the center and the periphery, tube 10 will see a diaphragm impedance which is appreciable. Consequently, tube 10 will be somewhat less than a half-wavelength at the operating frequency in order to provide an impedance match with the diaphragm, and may be considered to have an individual half-wave resonant frequency (with both ends free) somewhat above the resultant resonant frequency. The natural resonant frequency of the diaphragm 19 alone will also be somewhat different from the resultant frequency, because of the coupling of tube 10 thereto. (The effect of choke 20 will be considered later.)

It is preferred to employ a thin-walled tube for the magnetostrictive element so that its mass, and consequently its Q, is fairly low. This tends to reduce the effect of the individual resonant frequency of the tube on the overall resonant frequency. However, if desired, a solid rod may be employed.

As an illustrative example, in one particular embodiment the resonant frequency of diaphragm 19, by itself, was approximately 36 kilocycles and the half-wave resonant frequency of tube 10, by itself, was approximately 48 kilocycles. With the tube attached to the diaphragm as shown, a resultant operating frequency of approximately 38.5 kilocycles was obtained. By measuring the ultrasonic power delivered and trimming the length of tube 10, an optimum relationship can be determined.

Considering now the effect of clamping member 20, reference will first be made to FIGS. 3a and 3b. These are simplified diagrammatic representations rather than the actual physical elements of FIG. 1, and accordingly prime numbers have been employed.

Figure 3A:
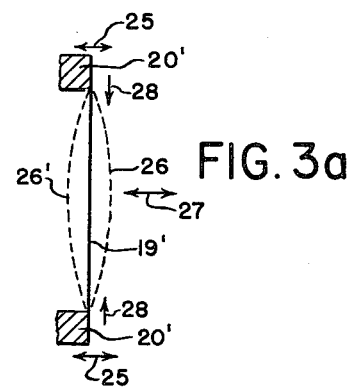
FIGS. 3a and 3b are diagrams illustrating the oscillation of the diaphragm and the resultant ring mode of oscillation in the clamping member.

FIG. 3a shows the mode of oscillation of a thin clamped circular diaphragm 19'. The periphery of the diaphragm is assumed to be prevented from moving in the direction shown by double-head arrows 25. When the diaphragm 19' is transmitting or receiving ultrasonic energy, it oscillates between two flexed positions such as shown at 26 and 26'. Since forces normal to the plane of the diaphragm as shown by double-headed arrow 27 will be required to produce the deflections, similar forces 25 will be present at the periphery.

When the diaphragm moves outwardly to position 26, the diameter thereof will tend to decrease, thus producing inward forces at the periphery as shown by arrows 28. The diaphragm is united with the end 20' of the clamping member so that forces 28 will tend to pull the end radially inwards around its entire circumference, as shown by dotted lines 29 in FIG. 3b. When the diaphragm moves to position 26', its diameter again tends to decrease, thereby tending to pull end 20' radially inwards to the dotted position as before.

Figure 3B:
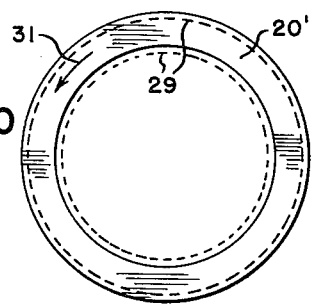

Due to its circular configuration and thickness, end 20' may be expected to resist strongly the deformation illustrated in FIG. 3b. However, in the preferred embodiment of the invention the dimensions of member 20 are selected so as to promote a ring mode of oscillation in the end united with the peripheral region of the diaphragm. This mode of oscillation is sometimes called the extentional ring mode of vibration. With a circular ring, the center line of the ring forms a circle of periodically varying radius.

FIG. 3b illustrates this mode of oscillation, the radius of the end 20' cyclically varying between full and dotted line positions. Thus, as the diaphragm 19' oscillates, a ring mode of oscillation is established in the end 20' of the clamping cylinder to which it is united. As will be apparent from FIGS. 3a and 3b, one complete cycle of oscillation of diaphragm 19' corresponds to two cycles of end 20', so that the frequency of oscillation in the ring mode will be twice the frequency of oscillation in the diaphragm.

The ring mode of oscillation will be supported when the path length around end 20' of the tubular member in the direction indicated by arrow 31 is equal to one wave-length at the frequency of the ring oscillation, which in turn is one wavelength at twice the frequency of diaphragm oscillation. For a thin ring, that is, a ring whose radial thickness is very small compared to its radius, the period T of the ring mode of oscillation is equal to $2\pi R/c$, where R is the radius and c is the velocity of propagation of the elastic wave around the ring.

Returning to FIG. 1, it will be understood that a ring mode of oscillation at twice the resonant frequency of the diaphragm and associated structure can be produced in the region near the end of clamping member 20 which is united with the diaphragm. This may be accomplished by proper selection of the diameter and wall thickness of member 20.

In FIG. 1 it will be seen that the wall thickness of member 20 is quite substantial by comparison with its radius, and hence it is somewhat uncertain just what value to pick for R in the above equation. Furthermore, the velocity of propagation of elastic waves around the ring is a function of the wall thickness as well as the material. Accordingly, although calculations facilitate preliminary design, certain departures from calculated dimensions are ordinarily required for optimum results. This will be discussed hereinafter after the effect of the length of member 20 is described.

Figure 4:
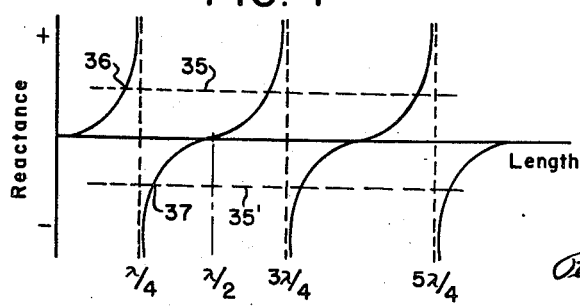
FIG. 4 shows the manner in which the reactance varies as a function of length of the clamping member.

From FIG. 1 it will be noted that although the front end of member 20 is united with the peripheral region of diaphragm 19, the rear end is free to move. When member 20 has a length which is appreciable in terms of wavelength, it functions as a mechanically resonant element. Curves of such an element are shown in FIG. 4. Here mechanical reactance is plotted as a function of length in fractions of a wavelength. As will be apparent, if clamping member 20 is a quarter-wavelength long, with its rear end free to move, the reactance at the front end will be exceedingly high. Theoretically it will be infinite, but in practice there are some losses which limit the resultant impedance. Consequently, if the length of member 20 is a quarter-wavelength at the operating frequency of the transducer, the peripheral region of diaphragm 19 will be prevented from moving in the lengthwise direction of member 20. Similar results would be obtained if member 20 were ¾ of a wavelength long, ⁵⁄₄ of a wavelength long, etc. Generally speaking, a multiple of odd quarter-wavelengths gives this result, the term "multiple" being understood to include one. Ordinarily, in order to save material and keep the transducer as short as possible, the one quarter-wavelength relationship would be employed.

Actually, in practice, it is not necessary that the impedance at the front end of clamping member 20 approach infinity, so long as it is sufficiently high to provide satisfactory clamping. Thus if an impedance such as shown by lines 35 or 35' suffices for adequate clamping, wave-lengths corresponding to points 36 or 37 may be employed. By selecting an intermediate value in this range, some tolerance is allowed in production. Inasmuch as the wavelength varies inversely with frequency, other dimensions of the transducer should be maintained sufficiently close so that the operating frequency does not fall outside the range of satisfactory clamping.

The longitudinal mode of operation may be used for clamping, without the ring mode of oscillation, if desired. However the combination of longitudinal and ring mode has been found to have highly advantageous effects in practice.

As will be observed, the effective diameter and hence the resonant frequency of diaphragm 19 will vary with the inside diameter of member 20. Also, the resonant frequency of a clamped diaphragm ordinarily is proportional to its thickness. Without the ring mode of oscillation, it is found that the thickness of the diaphragm and the inside diameter of clamping member 20 are fairly critical and must be kept to quite close tolerances for optimum operation, particularly when the overall resonant frequency of operation must be maintained in production. The length of tube 10 is also a factor.

With the effective diameter of member 20 properly selected to sustain the ring mode of oscillation, it is found that these tolerances are considerably relaxed due to the interaction of the ring mode of oscillation with the diaphragm oscillation. With the frequency of the ring mode established by the diameter, wall thickness and material of tubular member 20, it will tend to force the frequency of diaphragm oscillation to the proper value.

For example, if the diaphragm should tend to oscillate at a frequency somewhat less than one-half the ring mode frequency, the outward excursion of the diaphragm would tend to lag behind the radial contraction of the ring. Since the periphery of the diaphragm is united with member 20, this lag cannot exist and the outward excursion of the diaphragm is accelerated by the forces imparted to it by the contracting ring. As the diaphragm moves back toward its center position, the expanding ring will accelerate the return. Thus the diaphragm frequency is increased. On the other hand, if the diaphragm should tend to oscillate at a frequency somewhat greater than one-half the ring mode frequency, the diaphragm excursions would tend to lead the ring mode excursions, but the ring mode will exert retarding forces on the diaphragm to decrease its frequency. Thus in either case the diaphragm frequency is pulled toward one-half the ring mode frequency.

This frequency controlling effect is promoted by designing member 20 to have a high Q for the ring mode. With metal such as brass or steel, internal losses are small, and radiation losses from the ring oscillation will be constant for a given diameter. By increasing the wall thickness of member 20 the mass thereof is increased, and consequently the Q. Although diaphragm 19 may also be expected to have low internal losses, there will be substantial radiation losses due to its comparatively large area. Accordingly member 20 can be of sufficiently high Q, with reasonable wall thickness, to exercise a considerable control over the diaphragm frequency.

By virtue of Poisson coupling, the ring mode of oscillation at one end of member 20 will excite longitudinal waves therein at twice the operating frequency. With member 20 equal to or near a quarter-wavelength at the operating frequency, it will be equal to or near a half-wavelength for longitudinal waves at the double frequency of the ring mode. It will therefore be at or near longitudinal resonance at this double-frequency. Consequently the double-frequency longitudinal oscillations will support the ring mode oscillations and further enhance the frequency control exercised by member 20.

With control of the transducer operating frequency by the ring oscillation, it has been found possible to make the length of member 20 somewhat less than a quarter-wavelength while still retaining adequate margins for production variations. Thus lengths of the order of 0.20 wavelength have been found satisfactory in one specific embodiment, and even somewhat shorter lengths may be employed in some circumstances.

In designing the transducer, a sufficiently high impedance for the clamping action of member 20 can be ascertained by measuring the transducer output for various types of mountings, or by placing a vibration pickup at the edge of the diaphragm, and selecting the length accordingly. The frequency of ring resonance at the end of member 20 can be altered by changing either the outside or inside diameters of the member. Changing the wall thickness changes the velocity of propagation therein, and a change in the average diameter changes the effective path length around the member. A change in the inside diameter simultaneously changes the effective diameter of the diaphragm, and accordingly effects a somewhat greater change in operating frequency than a corresponding change in the outside diameter. These dimensions may be adjusted until optimum results are obtained.

Due to the dynamic clamping provided by member 20, the composite member 18 may be mounted in the casing without substantial transfer of energy thereto. Preferably the mounting is at the clamped end of member 20, substantially in the plane of the diaphragm. In FIG. 1, the mounting ring 21 is flush with the front surface of diaphragm 19 so as to provide a smooth face. A position slightly back from that shown, and in the neutral plane of the diaphragm (midway of its thickness) may be preferred in some cases. Advantageously the mounting ring 21 is thin so as to provide an impedance mismatch with member 20, thereby minimizing transfer to the casing 15 of any residual energy which may be present. Other mounting means may be employed if desired.

From the above description it will be clear that the specific embodiment shown contains four coupled resonant elements, namely, tube 10, diaphragm 19, ring mode in member 20, and longitudinal mode in member 20. By properly dimensioning the several elements as described, the individual resonant frequencies may be caused to give a very sharp overall transmission or response characteristic. However, by changing the relative dimensions of individual elements the individual resonant frequencies may be altered to broaden the overall characteristic, as will be understood by those skilled in the art. Also, damping can be employed at appropriate points to broaden the overall response, as will be understood, although at some loss in efficiency.

It will be apparent from the drawings that the transducer is relatively simple, rugged, and easy to manufacture. Inasmuch as the casing 15 is attached to the active elements of the transducer at a nodal region, the transducer can be mounted in any desired manner without appreciably affecting its operation.

Although magnetostrictive actuation is preferred, other forms of actuating mechanisms such as piezoelectric elements, etc. can be employed to drive the diaphragms, particularly for high operating frequencies.

As has been stated, although the longitudinal mode of oscillation in member 20 can be employed without the ring mode, it is preferred to employ both for most satisfactory results. It may also be desired to employ the ring mode of oscillation for frequency control, without the axial clamping provided by the longitudinal mode. This can be accomplished by suitable shortening of member 20.

The invention has been described particularly in connection with a transducer for use at ultrasonic frequencies, wherein it is especially important. However all or selected features thereof may be employed in acoustic transducers for lower frequencies if desired. Also more than one coil may be used with the magnetostrictive element to permit use in feedback oscillator circuits and the like.

These and other modifications can be made by those

I claim:

1. In an acoustic transducer including a diaphragm and means associated therewith for producing or responding to motion thereof, the combination which comprises a tubular member united with the peripheral region of said diaphragm and having a length predetermined so that longitudinal elastic waves propagating lengthwise within the wall thereof provide a high impedance to axial movement of said peripheral region of the diaphragm at the transducer operating frequency.

2. In an acoustic transducer including a diaphragm and means associated therewith for producing or responding to motion thereof, the combination which comprises a tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member.

3. In an acoustic transducer including a diaphragm and means associated therewith for producing or responding to motion thereof, the combination which comprises a tubular member united with the peripheral region of said diaphragm, the length of said tubular member being selected so that longitudinal elastic waves propagating lengthwise within the wall thereof provide a high impedance to axial movement of said peripheral region of the diaphragm, a casing, and mounting means attached to said tubular member near said peripheral region of the diaphragm for mounting the tubular member and diaphragm in said casing.

4. In an acoustic transducer including a diaphragm and means associated therewith for producing or responding to motion thereof, the combination which comprises a tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, a casing, and mounting means attached to the tubular member near said one end thereof for mounting said member in said casing.

5. In an acoustic transducer including a substantially flat diaphragm and means attached thereto for producing or responding to oscillations thereof, the combination which comprises a cylindrical tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, a casing, and mounting means attached to the tubular member near said one end thereof for mounting said member in said casing.

6. In an acoustic transducer including a diaphragm and means associated therewith for producing or responding to motion thereof, the combination which comprises a tubular member united with the peripheral region of said diaphragm and having a length predetermined so that longitudinal elastic waves propagating lengthwise within the wall thereof provide a high impedance to axial movement of said peripheral region of the diaphragm at the transducer operating frequency, and the path length around said tubular member being predetermined to provide a substantially resonant ring mode of oscillation in the region thereof united with said diaphragm as the diaphragm oscillates at the transducer operating frequency.

7. In an acoustic transducer including a diaphragm and means associated therewith for producing or responding to motion thereof, the combination which comprises a tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, and the peripheral dimensions of said tubular member at said one end being predetermined to provide a substantially resonant ring mode of oscillation in response to diaphragm oscillation.

8. In an acoustic transducer including a diaphragm and means associated therewith for producing or responding to motion thereof, the combination which comprises a cylindrical tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, the diameter and wall thickness of said tubular member at said one end being predetermined to resonate in substantially the extensional ring mode of vibration at substantially twice the transducer operating frequency.

9. In an acoustic transducer including a diaphragm and means associated therewith for producing or responding to motion thereof, the combination which comprises a member united with the peripheral region of said diaphragm and forming a ring section therearound, the diameter and thickness of said member being predetermined to resonate in substantially the extensional ring mode of vibration at substantially twice the transducer operating frequency.

10. An acoustic transducer which comprises a diaphragm, an elongated magnetostrictive member attached to said diaphragm and substantially perpendicular thereto, a coil encircling said magnetostrictive member, and a tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, said diaphragm and magnetostrictive member in combination having a frequency of mechanical resonance at substantially the operating frequency of the transducer.

11. An acoustic transducer which comprises a diaphragm, an elongated magnetostrictive member attached to said diaphragm and substantially perpendicular thereto, a casing, a coil mounted in said casing and encircling said magnetostrictive member, a tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, said diaphragm and magnetostrictive member in combination having a frequency of mechanical resonance at substantially the operating frequency of the transducer, and mounting means attached to the tubular member near said one end thereof for mounting said member in said casing.

12. An acoustic transducer which comprises a diaphragm, an elongated magnetostrictive member attached to said diaphragm and substantially perpendicular thereto, a coil encircling said magnetostrictive member, and a tubular member united at one end thereof with the peripheral region of said diaphragm, the length of said tubular member being predetermined so that longitudinal elastic waves propagating lengthwise within the wall thereof provide a high impedance to axial movement of said peripheral region of the diaphragm at the transducer operating frequency, said diaphragm and magnetostrictive member in combination having a frequency of mechanical resonance at substantially the operating frequency of the transducer, and the path length around said tubular member being predetermined to provide a substantially resonant ring mode of oscillation in the region thereof united with said diaphragm as the diaphragm oscillates.

13. An acoustic transducer which comprises a diaphragm, an elongated magnetostrictive member attached to said diaphragm and substantially perpendicular thereto, a coil encircling said magnetostrictive member, and a tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, said diaphragm and magnetostrictive member in combination having a frequency of mechanical resonance at substantially the operating frequency of the transducer, and the peripheral dimensions of said tubular member at said one end being predetermined to resonate in substantially a ring mode of oscillation at substantially twice the transducer operating frequency.

14. An acoustic transducer which comprises a diaphragm, an elongated magnetostrictive member attached to said diaphragm and substantially perpendicular thereto, a casing, a coil mounted in said casing and encircling said magnetostrictive member, a tubular member united at one end thereof with the peripheral region of said diaphragm, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, said diaphragm and magnetostrictive member in combination having a frequency of mechanical resonance at substantially the operating frequency of the transducer, the diameter and wall thickness of said tubular member at said one end being predetermined to resonate in substantially the extensional ring mode of vibration at substantially twice the transducer operating frequency, and mounting means attached to the tubular member near said one end thereof for mounting said member in said casing.

15. An acoustic transducer which compirses a substantially flat circular diaphragm, a cylindrical magnetostrictive tube attached to said diaphragm and substantially perpendicular thereto, a cylindrical tubular member united at one end thereof with the peripheral region of said diaphragm and substantially coaxial with said magnetostrictive tube, a casing, mounting means attached to the tubular member near said one end thereof for mounting said member in said casing, and a coil and magnet mounted in said casing and respectively encircling said magnetostrictive tube, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, said diaphragm and magnetostrictive member in combination having a frequency of mechanical resonance at substantially the operating frequency of the transducer, the diameter and wall thickness of said tubular member at said one end being predetermined to resonate in substantially the external ring mode of vibration at substantially twice the transducer operating frequency.

16. In an acoustic transducer including a diaphragm and means associated therewith for producing or responding to motion thereof, the combination which comprises a tubular member united at one end thereof with the peripheral region of said diaphragm and free at the other end thereof, the length of said tubular member being near an odd multiple of quarter-wavelengths at the transducer operating frequency for longitudinal elastic waves propagating lengthwise within the wall thereof to provide a high impedance to movement of said peripheral region of the diaphragm in the lengthwise direction of said member, a casing, and a thin flange attached to the tubular member near said one end thereof and to said casing for mounting the member in the casing.

17. An acoustic transducer which comprises a diaphragm, an elongated magnetostrictive member attached to said diaphragm and substantially perpendicular thereto, a casing, a coil mounted in said casing and encircling said magnetostrictive member, a tubular member united at one end thereof with the peripheral region of said diaphragm and free at the other end thereof, the length of said tubular member being near an odd multiple of quarter-wavelengths at the transducer operating frequency to provide a high impedance to movement of said peripheral region of the diaphragm in the lengthwise direction of said member, said diaphragm and magnetostrictive member in combination having a frequency of mechanical resonance at substantially the operating frequency of the transducer, the diameter and wall thickness of said tubular member at said one end being selected to resonate in substantially the extensional ring mode of vibration at substantially twice the transducer operating frequency, and a thin flange attached to the tubular member near said one end thereof and to said casing for mounting the member in the casing.

18. In an ultrasonic transducer including a resonant diaphragm structure and means associated therewith for producing or responding to motion thereof, the transducer having a resonant characteristic in the operating region thereof, the combination which comprises a member united with the peripheral region of said resonant diaphragm and forming a ring section therearound, the oscillations of the diaphragm producing an alternating radial force on said ring section, the peripheral dimensions of said member being predetermined to yield a resonant ring mode of oscillation thereof in response to diaphragm oscillations at substantially the resonant frequency of the diaphragm structure.

References Cited in the file of this patent
UNITED STATES PATENTS

| 1,882,401 | Pierce | Oct. 11, 1932 |
| 2,328,496 | Rocard | Aug. 31, 1943 |
| 2,498,990 | Fryklund | Feb. 28, 1950 |
| 2,671,213 | Papuano | Mar. 2, 1954 |

UNITED STATES PATENT OFFICE
CERTIFICATE OF CORRECTION

Patent No. 3,070,790                          December 25, 1962

Wilfred Roth

It is hereby certified that error appears in the above numbered patent requiring correction and that the said Letters Patent should read as corrected below.

Column 2, line 21, for "necessary" read -- unnecessary --; column 4, line 18, for "in" read -- of --; column 6, line 69, for "ultarsonic" read -- ultrasonic --; column 10, line 9, for "external" read -- extensional --.

Signed and sealed this 25th day of June 1963.

(SEAL)
Attest:

ERNEST W. SWIDER
Attesting Officer

DAVID L. LADD
Commissioner of Patents